(12) United States Patent
Fateh

(10) Patent No.: US 9,925,458 B2
(45) Date of Patent: Mar. 27, 2018

(54) SCENT DISPERSAL SYSTEMS FOR HEAD-MOUNTED DISPLAYS

(71) Applicant: Eye Labs, LLC, Mountain View, CA (US)

(72) Inventor: Sina Fateh, Mountain View, CA (US)

(73) Assignee: EYE LABS, LLC, Mountain View, CA (US)

( * ) Notice: Subject to any disclaimer, the term of this patent is extended or adjusted under 35 U.S.C. 154(b) by 0 days.

(21) Appl. No.: 15/081,556

(22) Filed: Mar. 25, 2016

(65) Prior Publication Data

US 2017/0274279 A1   Sep. 28, 2017

Related U.S. Application Data

(60) Provisional application No. 62/311,347, filed on Mar. 21, 2016.

(51) Int. Cl.

| | |
|---|---|
| *A63F 13/28* | (2014.01) |
| *G02B 27/01* | (2006.01) |
| *G06T 19/00* | (2011.01) |
| *B05B 7/00* | (2006.01) |
| *B05B 7/24* | (2006.01) |

(Continued)

(52) U.S. Cl.
CPC ............. *A63F 13/28* (2014.09); *A63F 13/26* (2014.09); *B05B 7/0081* (2013.01); *B05B 7/2486* (2013.01); *B05B 12/004* (2013.01); *B05B 12/12* (2013.01); *G02B 27/0176* (2013.01); *G06F 17/30106* (2013.01); *G06T 19/006* (2013.01)

(58) Field of Classification Search
CPC .......... G02B 2027/0178; G02B 27/017; G02B 2027/0132; G02B 2027/014; G02B 2027/0156; G06F 3/011
See application file for complete search history.

(56) References Cited

U.S. PATENT DOCUMENTS

| | | | | |
|---|---|---|---|---|
| 5,538,013 A | * | 7/1996 | Brannon | ............ A41D 13/1192 128/857 |
| 5,739,797 A | * | 4/1998 | Karasawa | ............ G02B 27/017 345/8 |

(Continued)

OTHER PUBLICATIONS

U.S. Appl. No. 15/469,397, of Fateh, S. filed Mar. 24, 2017.

(Continued)

*Primary Examiner* — Viet Pham
(74) *Attorney, Agent, or Firm* — Perkins Coie LLP

(57) ABSTRACT

Introduced herein are various systems and techniques for dispensing scents from a scent delivery system. The scent delivery system could be a self-contained unit that is attachable to a head-mounted display (HMD) or could be integrated into the HMD itself. The scent delivery system can be used to improve the realism of content (e.g., visual content, audio content) experienced via the HMD. More specifically, the scent delivery system can be configured to dispense one or more scents in response to determining a particular scene is being experienced by the user. Different scents can be dispensed based on characteristics of the content. In some embodiments, the scent(s) are held in capsules that are housed within the scent delivery system. The capsules may be readily replaceable by the user, which enables the scent(s) to be customized based on what content is to be shown or projected in the future.

21 Claims, 10 Drawing Sheets

(51) Int. Cl.
*B05B 12/00* (2018.01)
*B05B 12/12* (2006.01)
*A63F 13/26* (2014.01)
*G06F 17/30* (2006.01)

(56) References Cited

U.S. PATENT DOCUMENTS

| | | | | |
|---|---|---|---|---|
| 5,995,770 | A * | 11/1999 | Rochford | G03B 17/24 396/311 |
| 6,602,475 | B1 * | 8/2003 | Chiao | A61L 9/035 222/146.5 |
| 6,758,215 | B2 * | 7/2004 | Begum | A41D 13/1161 128/202.15 |
| 2002/0018181 | A1 * | 2/2002 | Manne | A61L 9/122 352/85 |
| 2007/0066916 | A1 | 3/2007 | Lemos | |
| 2010/0163034 | A1 | 7/2010 | Roderick | |
| 2010/0309434 | A1 * | 12/2010 | Van Schijndel | A61L 9/125 352/85 |
| 2014/0069420 | A1 * | 3/2014 | Richter | A61M 15/0065 128/200.21 |
| 2014/0285403 | A1 | 9/2014 | Kobayashi | |
| 2015/0241708 | A1 * | 8/2015 | Watanabe | G09F 19/00 386/230 |
| 2017/0266676 | A1 | 9/2017 | Fateh | |

OTHER PUBLICATIONS

International Search Report and Written Opinion dated Sep. 7, 2017, for International Application No. PCT/US17/23209, 7 pages.
Non-Final Office Action dated Jun. 30, 2017 for U.S. Appl. No. 15/469,397 of Fateh, S., filed Mar. 24, 2017.
Horsey, Julian , "Feelreal Virtual Reality Helmet Lets You Feel and Smell the Action (video)", https://www.geeky-gadgets.com/feelreal-virtual-reality-helmet-lets-you-feel-and-smell-the-action-01-05-2015/, May 1, 2015.

* cited by examiner

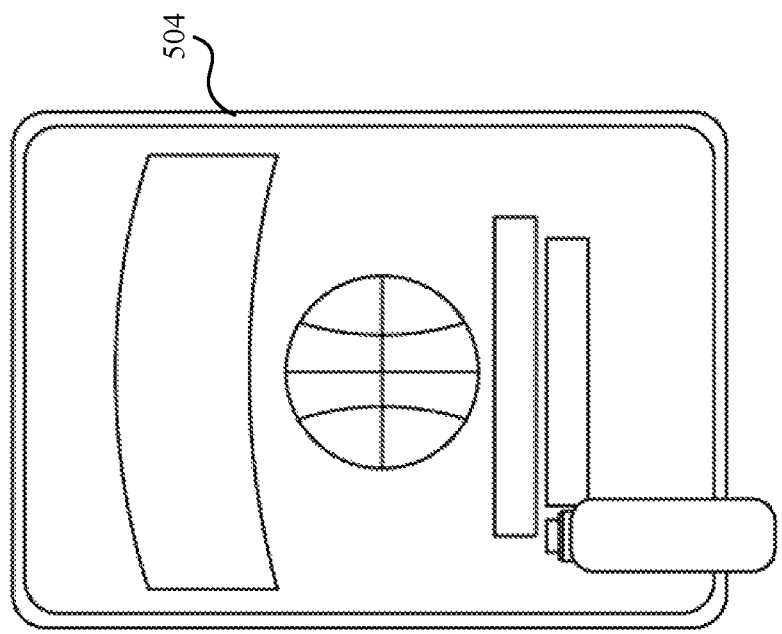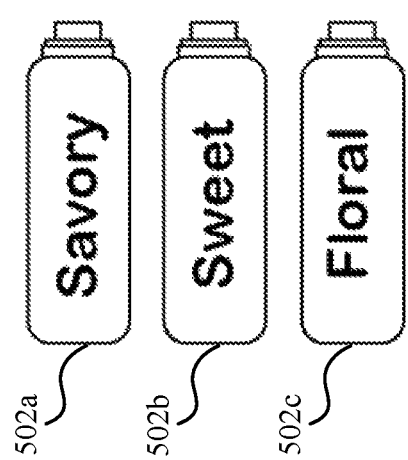
FIG. 5A

600

602
Provide a scent delivery system for an HMD

604
Enable a user to readily secure the scent delivery system to the HMD

606
Enable the user to readily replace one or more capsules housed within the scent delivery system 608
Allow the user the modify whether the scent feature is enabled or disabled 610
Cause the scent delivery system to dispense a scent from at least one of the capsules when the scent feature is enabled 612
Facilitate dispersal of the scent after a predetermined time period or in response to a user action

702
Receive an indication a scent feature has been enabled

704
Monitor the content presented by the HMD

706
Generate an output signal upon determining a keyframe has been reached

708
Transmit the output signal to scent circuitry

710
Cause a pump to dispense at least one scent

712
Monitor the user's reaction to the scent

SCENT DISPERSAL SYSTEMS FOR HEAD-MOUNTED DISPLAYS

CROSS-REFERENCE TO RELATED APPLICATIONS

This application claims priority to and the benefit of U.S. Provisional Application No. 62/311,347 entitled "HEAD-MOUNTED DISPLAYS THAT ENABLE INTERACTIVE SCENT EXPERIENCES" and filed on Mar. 21, 2016, which is incorporated by reference in its entirety.

RELATED FIELD

The present technology relates to display devices for digital content and, more specifically, display devices that enable users to smell scents while viewing virtual or augmented reality content.

BACKGROUND

The sense of smell is one of our strong senses. Certain scents often remind us of moments (both good and bad) that we first experienced days, weeks, or years ago. Scents can also make be highly effective in helping us distinguish items or locations from one another.

Entities, such as production studios, movie theaters, and amusement parks, have long attempted to enhance interactive experiences by introducing scents. For example, "Smell-O-Vision" was a system that released scents during the projection of a film so that the viewer could "smell" what was happening in the movie. Similarly, the "Smellitizer" was developed by the Walt Disney Company to deliver faint scents on cue at certain locations, such as attractions (e.g., Soarin' Over California at Disneyland) and storefronts (e.g., Main Street Bakery).

BRIEF DESCRIPTION OF THE DRAWINGS

These and other objects, features and characteristics of the present invention will become more apparent to those skilled in the art from a study of the following Detailed Description in conjunction with the appended claims and drawings, all of which form a part of this specification.

FIG. 5A depicts scent capsules that can be installed within a scent delivery system.

FIG. 6 depicts a process for attaching a scent delivery system to an HMD.

FIG. 7 depicts a process for dispensing one or more scents by a scent delivery system that is attached to an HMD.

Figure 1A:
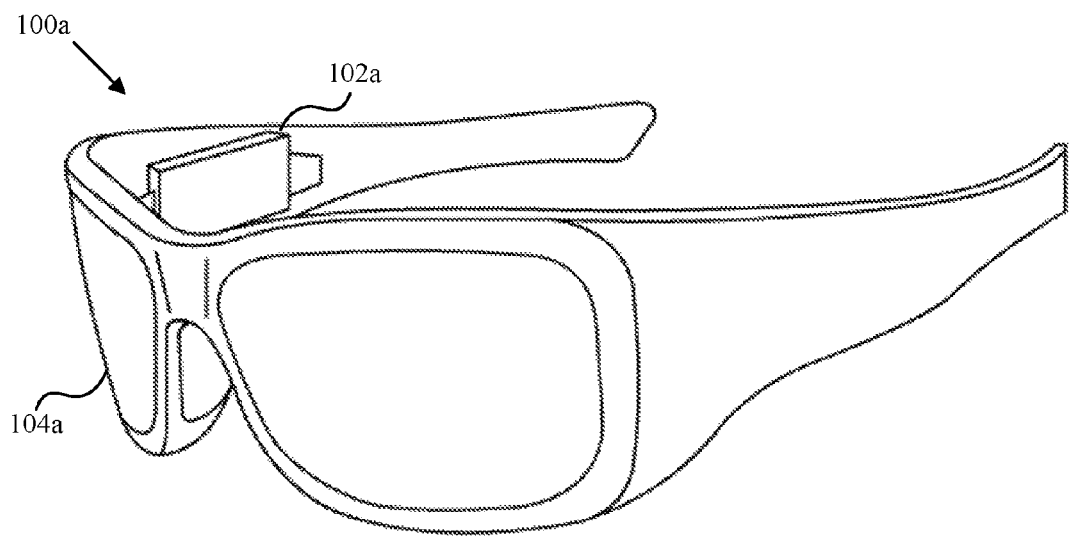
FIG. 1A depicts a conventional head-mounted display (HMD) that includes an image display system and an optical display surface configured to reflect light.

The figures depict various embodiments of this disclosure for purposes of illustration only. One skilled in the art will readily recognize from the following Detailed Description that alternative embodiments of the systems and methods illustrated herein may be employed without departing from the principles of the invention described herein.

DETAILED DESCRIPTION

Systems and techniques are described herein for dispensing scents based on the digital content shown by head-mounted displays (HMDs). More specifically, scent delivery systems (also referred to as scent-enabling units) are described herein that may be separately attachable to an HMD or may be integrated within the HMD itself. A scent delivery system can include one or more capsules or reservoirs of scented liquid or air that can each be selectively dispensed by a pump at the appropriate time. For example, a pine scent could be dispensed when the HMD depicts a digital forest, while a vanilla scent could be dispensed when the HMD depicts a digital kitchen.

Unlike traditional scent dispersal systems (e.g., the Smell-O-Vision or the Smellitizer), the scent delivery systems described herein are readily portable and allow scents to be delivered directly to an individual user of an HMD. Dispersal of the scents typically enhances the realism of digital (e.g., augmented or virtual) content viewed by a user by replacing unrelated real-world stimuli with stimuli (e.g., smells emanating from a kitchen). Said another way, the scent dispersal systems increase the realism of digital content by tricking the user's olfactory sense (i.e., sense of smell).

References will be made below to various embodiments, which are illustrated in the accompanying drawings. The same or similar reference numerals have been used throughout the drawings to refer to the same or like parts. The accompanying figures are included to provide a further understanding of the invention. One skilled in the art will understand that various features of the embodiments described herein and illustrated by the figures can be used in any and all combinations.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. For example, two devices may be coupled directly to one another, or via one or more intermediary channels or devices. As another example, devices may be coupled in such a way that information can be passed there between, while not sharing any physical connection with one another. The words "associate with," meanwhile, means connecting or relating objects, items, etc. Additionally, the words "herein," "above," "below," and words of similar import shall refer to this application as a whole and not to any particular portions of this application. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or another output using specified input(s). A module may or may not be self-contained. An application or software program may include one or more modules, or a module may include one or more applications or software programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any of the terms discussed herein, and special significance is not to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

System Overview

Figure 1B:
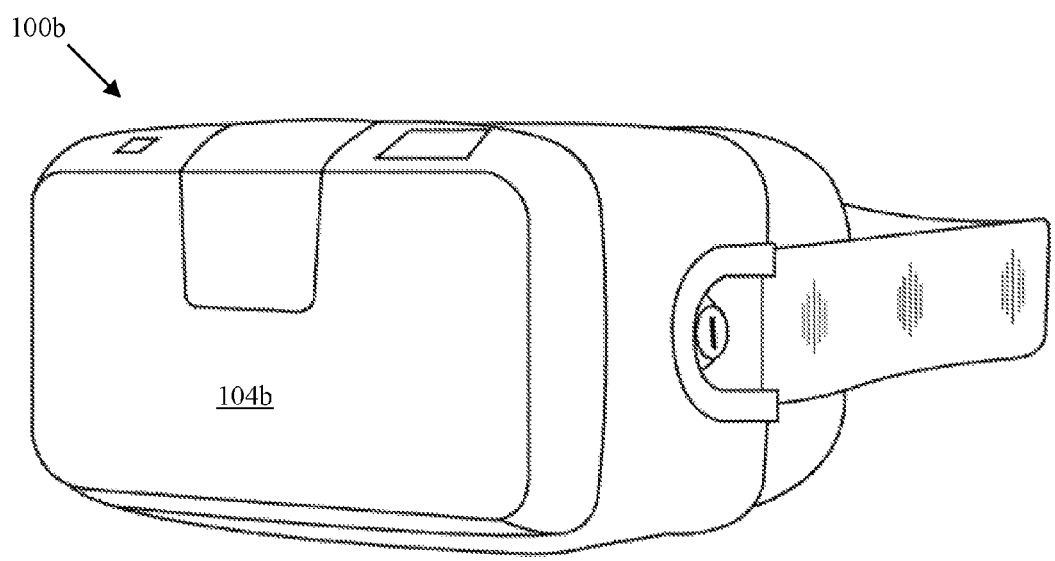
FIG. 1B depicts a conventional HMD that includes an image display system and an optical display surface configured to reflect light.

FIGS. 1A-B depict conventional head-mounted displays (HMDs) 100*a-b* that each include an image display system 102*a* and an optical display surface 104*a-b* configured to reflect or emit light. HMDs are typically designed so that digital content emitted by the image display system 102*a* is reflected by the optical display surface 104*a-b* towards the user's eyes or is projected directly into the user's eyes.

Conventional HMDs 100*a-b* either partially or entirely cover the user's eyes,. However, as shown by FIGS. 1A-B, the conventional HMDs 100*a-b* do not cover the user's nose or mouth, which separates or isolates the user's critical senses. For example, the HMDs 100*a-b* shown here isolate the user's olfactory (smell) and gustatory (taste) senses from the user's visual sense.

Consequently, a user of a conventional HMD will continue to receive stimuli from the real world that can disrupt the realism of the augmented or virtual reality content shown by the HMD. In fact, some of these stimuli may be partially or entirely counter to what the user expects. For example, the user might smell a fried chicken scent that is emanating from the kitchen while viewing a virtual environment, such as the inside of an spaceship, through an HMD. Unrelated stimuli are likely to cause the user to have a disjointed and unrealistic experience while using the HMD.

HMDs can be configured to display two different types of digital imagery. First, some HMDs are configured to display simulated (e.g., computer-generated) digital images that together form an entirely virtual environment. This is referred to as "virtual reality." Virtual reality generally requires the user wear a helmet, goggles, etc., that form an enclosed area around the user's eyes and block out the real-world. Second, some HMDs are configured to display simulated (e.g., computer-generated) images that are integrated into real world content perceived by the user. This is referred to as "augmented reality." Augmented reality allows the user to concurrently view virtual and real world imagery and, in some instances, interact with virtual content that relates to what is seen the real world. Generally, the user is able to distinguish between the virtual content and the real world imagery. For example, augmentation may take place through superposition of a simulated image on a non-simulated, real-world environment, which can allow the user to view additional data relevant to a desired task, the local environment, etc. The simulated image could also be adapted to allow for user interaction. However, augmented and virtual reality experiences are generally limited in how realistic they are because they are largely visual experiences.

HMD systems also fall into three general categories: binocular, bi-ocular, and monocular systems. Binocular HMD systems present a separate image to each of the user's eyes, while bi-ocular HMD systems present a single image to both of the user's eyes, and monocular HMD systems present a single image to only one of the user's eyes. One skilled in the art will recognize that the systems and techniques described herein can be adapted for binocular, bi-ocular, or monocular systems. The use of one of these terms in describing an embodiment is for the purposes of illustration only.

HMDs enable users to more easily interact with augmented or virtual reality assets. The assets can include, for example, applications, games, and cinematic videos. HMDs could also be designed to facilitate non-visual experiences as well. For example, many conventional HMDs include (or can be easily paired with) headphones or speakers through which audio assets (e.g., songs, audiobooks) can be projected.

Figure 2A:
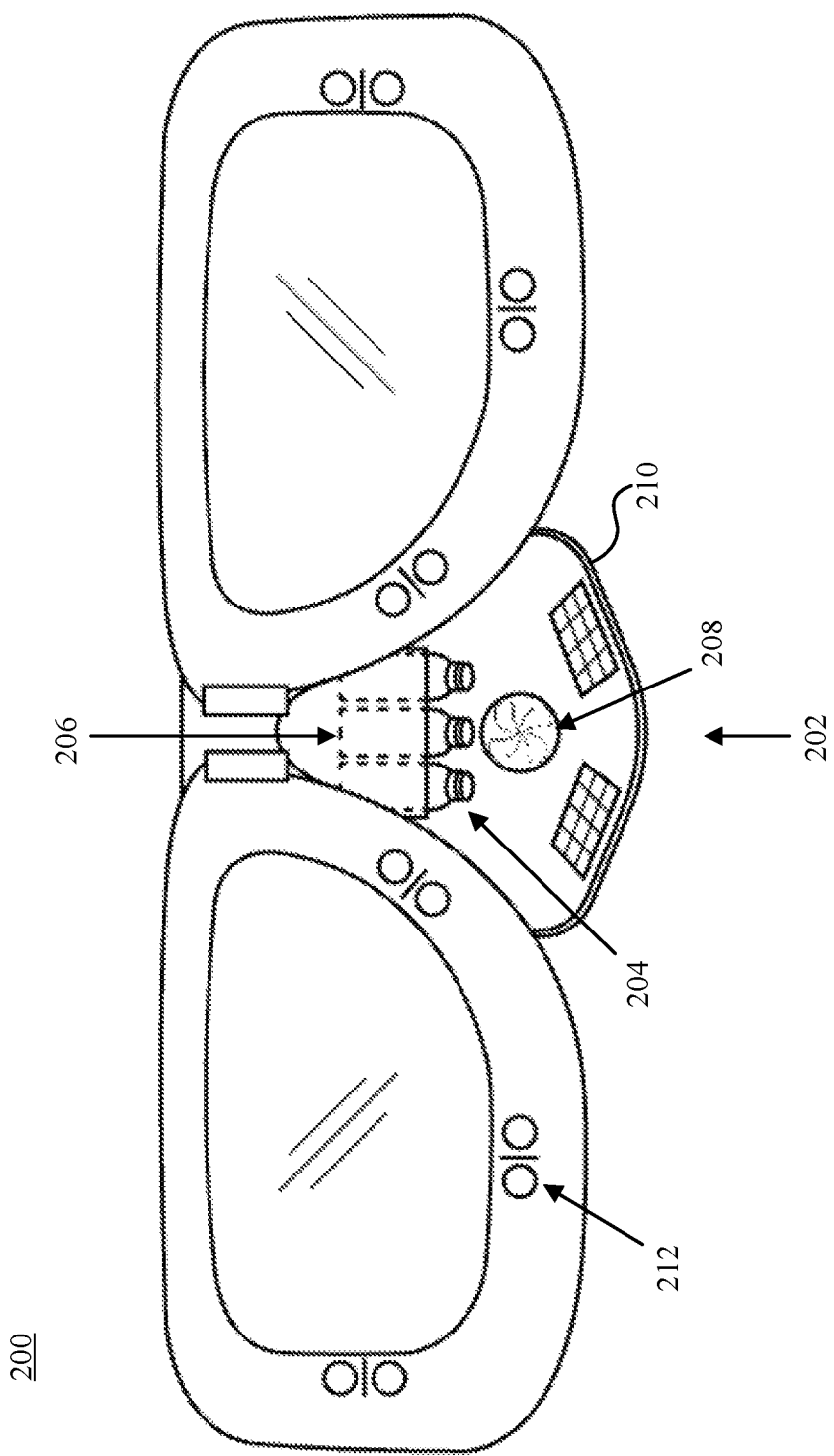
FIG. 2A is an inside view of a binocular HMD that includes a scent delivery system.
Figure 2B:
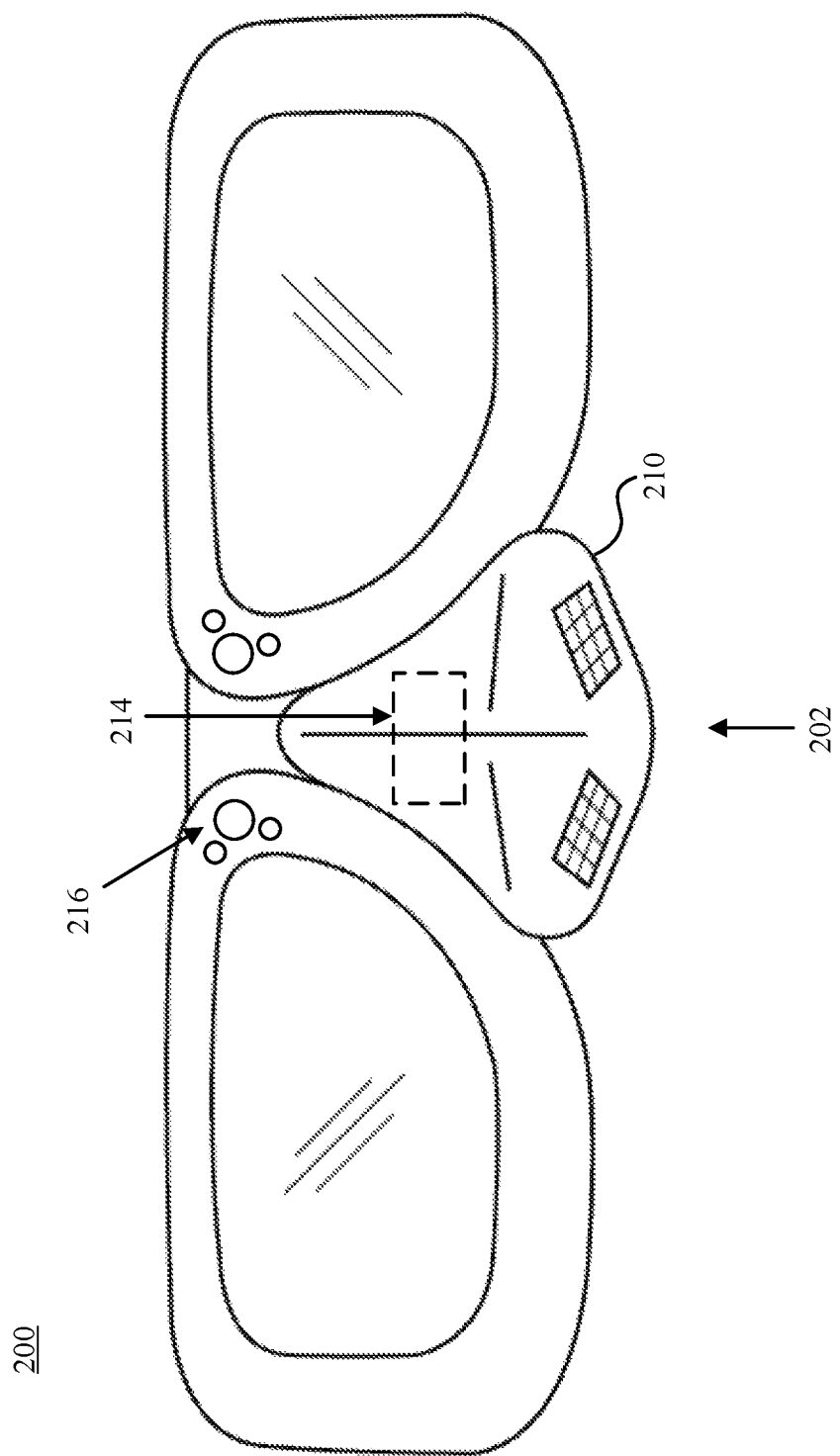
FIG. 2B is a front view of the binocular HMD that includes a scent delivery system.

FIG. 2A is an inside view of a binocular HMD 200 that includes a scent delivery system 202. FIG. 2B is a front view of the binocular HMD 200 that includes a scent delivery system 202. The scent delivery systems described herein enhance the realism of digital (e.g., augmented or virtual) content shown to a user by replacing real-world stimuli with stimuli that are related to the digital content being viewed by the user. Said another way, the technologies increase the realism of digital content by tricking the user's olfactory sense (i.e., sense of smell).

As further described below, the scent delivery system 202 can be completely self-contained or could be integrated into the binocular HMD 200. For instance, in some embodiments the scent delivery system 202 is detachably connectable to the frame of the binocular HMD 200 using one or more fasteners, such as magnets or mechanical clips/tracks. In other embodiments, the scent delivery system 202 is fixedly attached to the frame of the binocular HMD 200 using, for example, screws, nuts and bolts, or an adhesive material.

Additionally or alternatively, some or all of the components that enable scent to be dispensed (e.g., pumps, reservoirs, fan) could be integrated within the HMD. For example, the pump(s) and reservoir(s) may be integrated into the frame of an HMD (and thus no attachment may be necessary). One skilled in the art will recognize that a binocular HMD is described herein for the purposes of illustration only. The scent delivery systems and techniques described herein are equally applicable to monocular HMDs and bi-ocular HMDs. In some embodiments, the scent delivery system 202 is customizable for a particular user, for a particular type of experience (e.g., augmented or virtual reality content), or for a particular HMD (e.g., Oculus Rift or Microsoft Hololens).

The scent delivery system 202 can be designed so that it partially or entirely covers the user's nose. For example, FIGS. 2A-B depict a scent delivery system 202 that completely envelops the user's nose. However, the scent delivery system 202 could instead be designed so that the base of the user's nose is exposed. In some embodiments, some of the components of the scent delivery system 202 (e.g., the pumps 204, reservoirs 206, and/or fan 208) are integrated into the binocular HMD 200 so that the binocular HMD 200 would appear similar to a conventional HMD (e.g., the HMDs of FIGS. 1A-B) despite supporting scent functionality.

More specifically, the scent delivery system 202 can include a structural frame 210, one or more pumps 204, one or more reservoirs 206, and a fan 208. The structural frame 210 can include features (e.g., detents, holes) that allow the scent delivery system 202 to be connected to the binocular HMD 200. The structural frame 210 could also include fasteners, such as magnets or mechanical clips/tracks.

The pump(s) 204 allow scented liquid or air stored in the reservoir(s) 206 to be dispensed in particular quantities. More specifically, the pump(s) 204 can spray a scent directly toward the user's nose or can spray the scent within the internal cavity of the structural frame 210 (in which case the fan 208 could direct the scent towards the user's nose). As further described below, the pump(s) 204 may dispense a small quantity of one scent when a slight aroma is desired, a large quantity of one scent when a strong aroma is desired, small or large quantities of multiple scents simultaneously, etc. The scent(s) could also or instead be delivered via small absorbent pads that are connected to the reservoir(s) 206 and are disposed near the user's nose. Unlike the pumps (which are able to selectively dispense scents at certain times), the absorbent pads typically continually dispense small amounts of scent.

The reservoir(s) 206 generally retain air or liquid having different scents. For example, the three reservoirs depicted in FIGS. 2A-B may correspond to general scents (e.g., sweet, savory, and floral), specific scents (e.g., cinnamon, citrus, and roses), or some combination thereof. Moreover, the reservoirs may be readily replaceable by the user or some other entity (e.g., the manufacturer of the HMD or a service representative). In such embodiments, the reservoirs could be replaced by "capsules" of scented material that are easily replaceable and enable the user to customize which scent(s) can be dispensed by the scent delivery system 202.

The fan 208 could be set to continuously or periodically circulate air around the user's nose. For example, the fan 208 may only circulate air when the scent delivery system 202 begins dispensing scents or when the user enables the fan 202 (e.g., turns a fan setting to "on"). In some embodiments, the structural frame 210 includes one or more breaks or openings that allow air to more easily circulate through the internal cavity of the structural frame 210. These opening(s) may be strategically positioned with respect to the user's noise (e.g., near the nostrils as shown in FIGS. 2A-B) or with respect to the pump(s) 204 or fan 208.

In some embodiments, the binocular HMD 200 also includes other structural features or components that enhance the user's experience. For example, the binocular HMD 200 may include one or more sensors 212 positioned proximate to the user's face that measure temperature, humidity, motion, etc. Scent circuitry 214 may be responsible for modifying which scent(s) are dispensed, how much of each scent is dispensed, etc., based on signals received from each of the sensor(s) 212. For example, if the sensor(s) 212 indicate that the user's temperature has begun to rise and the user has begun to sweat, the scent circuitry 214 may lessen the amount of scent dispensed by each pump to avoid overstimulation of the user's senses.

More specifically, the scent circuitry 214 (which may also be referred to as an "electronics module") can process signals generated by each of the sensor(s) 212 and optimize the delivery of scents by the pump(s) 204. The scent circuitry can include a power supply (e.g., a battery or an electrical coupling to the power supply of the HMD), memory, one or more processors, and/or a communication module that allows the scent delivery system 202 to communicate with the binocular HMD 200 and/or another computing device (e.g., a mobile phone, tablet, personal computer, or server). The communication module may allow the scent delivery system 202 to communicate over a local area network (LAN), wide-area network (WAN), metropolitan area networks (MAN), cellular network, Bluetooth connection, Near Field Communication (NFC) connection, and/or the Internet.

Scents are preferably dispensed by the pump(s) 204 responsive to what content is being shown or projected by the binocular HMD 200. For example, the scent circuitry 214 may specify that a floral scent should be dispensed when a flower is shown in a cinematic video. As another example, the scent circuitry 214 may specify that a pine scent should be dispensed when a character in an audio recording (e.g., an audiobook) enters a forest. The scent circuitry 214 (as well as the other components of the scent delivery system 202) may be powered through a wired or wireless medium. For example, in some embodiments the scent circuitry 214 includes an internal power supply (e.g., a rechargeable battery), while in other embodiments the scent circuitry is electrically coupled to, and powered by, the binocular HMD 200.

One or more sensors 216 could also be disposed on the outside of the scent delivery system 202 and/or the binocular HMD 200 that monitor various aspects of the user's ambient environment. For example, the sensor(s) may include a camera configured to capture the user's interactions with the local environment, a light sensor configured to track ambient illuminance levels, an audio sensor configured to sense vocal commands, etc. One skilled in the art will recognize that many other types of sensors could be included and, in some instances, may be preferred. The type(s) of sensor(s)

216 could be chosen because the HMD system is adapted for a particular application. For example, an HMD designed for outdoor use may include a temperature sensor and a wind sensor to determine whether additional scent needs to be dispensed to counteract a windy environment.

Unlike traditional scent dispersal systems (e.g., Smell-O-Vision, Smellitizer), the technologies described herein are readily portable and allow scents to be delivered directly to an individual user of an HMD. Because the scent can be delivered locally (i.e., to a particular user), other individuals who are nearby may not be able to smell the dispensed scent(s). This enables multiple users to experience realistic augmented or entirely content in close proximity to one another.

Figure 3:
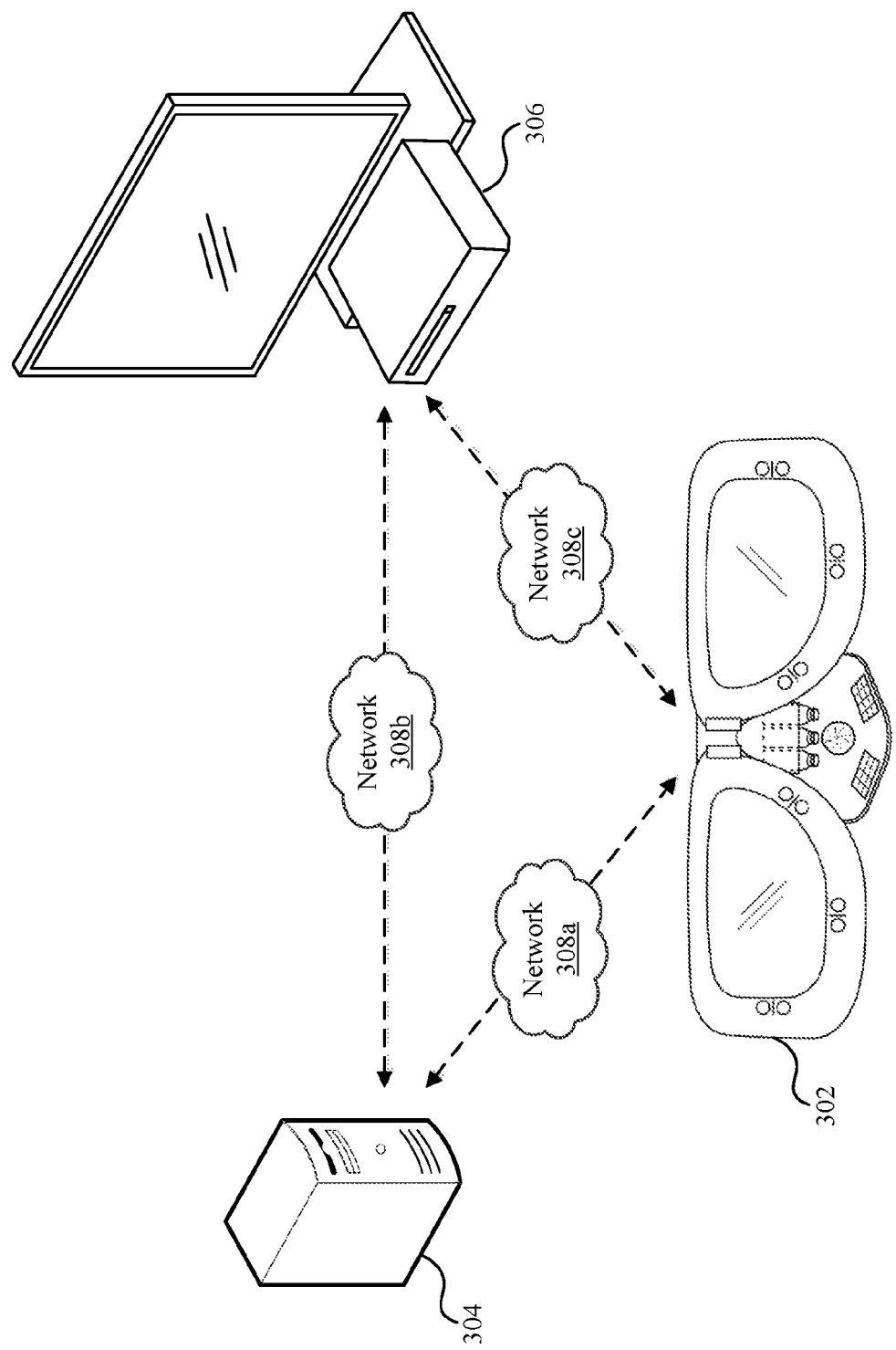
FIG. 3 depicts an example of a network environment that includes an HMD having a scent delivery system, a content server, and another computing device.

FIG. 3 depicts an example of a network environment that includes an HMD 302 having a scent delivery system, a content server 304, and another computing device 306 (here, a television and game console). The HMD 302, content server 304, and/or computing device 306 can be connected via one or more computer networks 308a-c, which may represent local area networks (LANs), wide-area networks (WANs), metropolitan area networks (MANs), cellular networks, Bluetooth connections, Near Field Communication (NFC) connections, and/or the Internet. Examples of computing devices 306 can include, for example, cellular phones, tablets, laptops, personal computers, network-connected ("smart") televisions, game consoles (e.g., Sony PlayStation or Microsoft Xbox game console), network-connected mobile gaming devices (e.g., Sony PSP), television-connected devices (e.g., Roku, Apple TV, Google Chromecast, Amazon FireStick, Android TV, Blu-ray disc players), other network-accessible devices having an interface (e.g., Apple iPod Touch), etc.

Generally, the HMD 302 is responsible for generating and presenting augmented or virtual reality content to a user. The content server 304 and/or the computing device 306 can be coupled, wired or wirelessly, to the HMD 302. For example, the HMD 302 may be communicatively coupled to the computing device 306 via an antenna, wireless communication module, etc. In some embodiments the content server 304 and/or the computing device 306 are responsible for delivering content to the HMD 302, while in other embodiments the HMD 302 stores all content locally (e.g., within a memory).

When the HMD 302 is configured to generate virtual reality content, it may only be communicatively coupled to the content server 304. However, when the HMD 302 is configured to generate augmented reality content, it could be communicatively coupled to the content server 304 and/or the computing device 306. Consequently, the user of the HMD 302 may be able to see augmented reality content when viewing a video, listening to audio, or playing video games using the computing device 306.

In order to make these experiences more realistic, the HMD 302 (and, more specifically, the scent delivery system) may be configured to dispense one or more scents in particular instances. For example, the HMD 302 could dispense a floral scent when a virtual garden is presented by the HMD 302. As another example, the HMD 302 could dispense vanilla and cinnamon scents when digital content is presented by the HMD 302 that augments a cooking show shown by a television in the real world. Further yet, the HMD 302 could dispense a pine scent when the user watches a golf show on a television in the real world (and no content is being shown by the HMD). Thus, the HMD 302 may dispense scents regardless of whether it is currently responsible for displaying, projecting, etc., content to a user.

Figure 4:
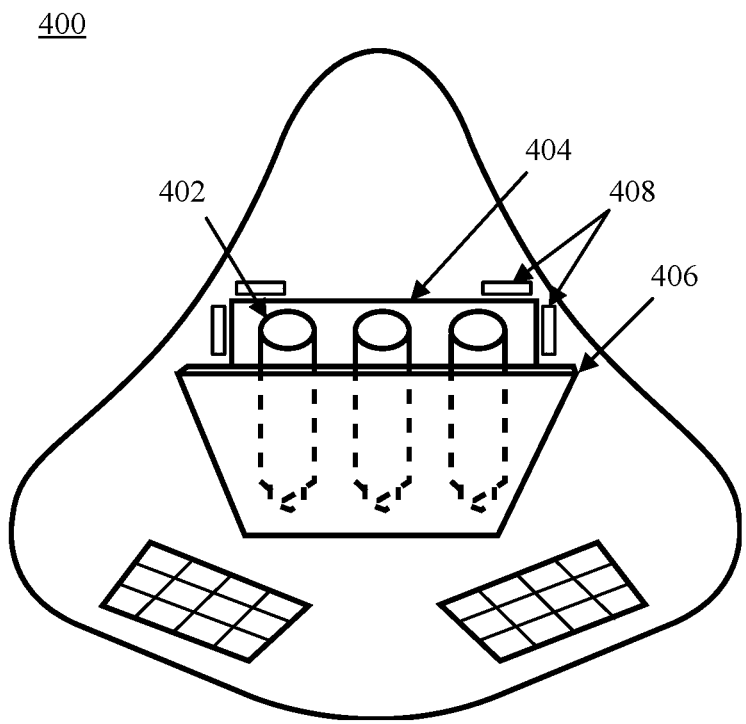
FIG. 4 depicts a scent delivery system that can be affixed to an HMD configured to display augmented or virtual reality content.

FIG. 4 depicts a scent delivery system 400 that can be detachably connected to an HMD configured to display augmented or virtual reality content. The scent delivery system 400 can include an internal cavity or compartment 404 that can hold one or more reservoirs 402 of scented air or liquid. Each scent may correspond to a separate, interchangeable "capsules" that can be easily removed from the scent delivery system 400. The removable capsules may correspond to a general or specific scent.

As shown in FIG. 4, the reservoirs 402 are often retained within a compartment 404 that is readily accessible to the user. For example, the scent delivery system 400 may include a door 406 that can be securely closed via fasteners 408, such as magnets, mechanical clips/tracks, an adhesive material, etc. The door 406 enables a user to readily replace the reservoirs 402 in response to determining new scents are desired or necessary for augmented or virtual reality content that is to be shown by the HMD. For example, the user may wish to replace some or all of the reservoirs 402 prior to watching a particular video or playing a particular video game.

The scent delivery system 400 may also dispense scents from the reservoirs 402 in order to affect the user's sense of taste. HMDs that show virtual reality content prevent users from being able to see their hands (and, more specifically, what they are eating or drinking while viewing the digital content). However, there is a strong physiological connection between different sources of sensory information. For instance, the ability to recognize flavors is often affected by visual information and olfactory (i.e., smell) information. The HMDs and scent delivery systems described herein can make use of these physiological connections to trick the user's senses.

For example, a user could be tricked into believing that water is a sweeter drink by having the HMD display a sweet drink and/or by having the scent delivery system 400 dispense a sweet scent. Similarly, the user could be tricked into believing a wine is much stronger or better than it actually is (e.g., by presenting a picturesque vineyard and/or dispensing an appropriate smell). The scent delivery systems described herein can be used to make generally bland foods seem more salty, spicy, bitter, or sour by modifying what content is shown to the user on the HMD and/or what scent(s) are dispensed by the scent delivery system. Said another way, visual and olfactory experiences can be selectively modified in order to improve the user's ability to identify flavors.

FIG. 5A depicts capsules 502a-c of scented material (e.g., liquid or air) that can be installed within a scent delivery system. As noted above, the capsules may correspond to general scents (e.g., sweet, savory, and floral) or specific scents (e.g., cinnamon, pine, and roses). Similar scents are often sufficient to enable a user to accurately remember or replicate previous experiences. Thus, a scent delivery system may be configured to dispense a floral scent regardless of whether the HMD is displaying a garden of roses or a field of tulips. Most individuals imprint their prior knowledge on basic scents (and, thus, do not need to experience a specific scent in order to believe an experience is authentic). For example, a general sweet scent could be sufficient to trick the user regardless of whether the digital content being shown involves cakes, cookies, candy, etc.

The capsules 502a-c could also be designed to be experienced in conjunction with certain content (e.g., audio files or digital content, such as augmented or virtual reality content). Consequently, one or more capsules could be distributed with movies, audiobooks, video games, etc., that are to be experienced via an HMD. For example, a sports-themed video game 504 could be packaged with a capsule that includes a hot dog or popcorn scent (or some other scent that would be commonly experienced at an athletic event). Similarly, a baking-themed television program could be packaged with a capsule having a general sweet scent or multiple capsules that specific scents, such as cinnamon, vanilla, and chocolate.

Figure 5B:
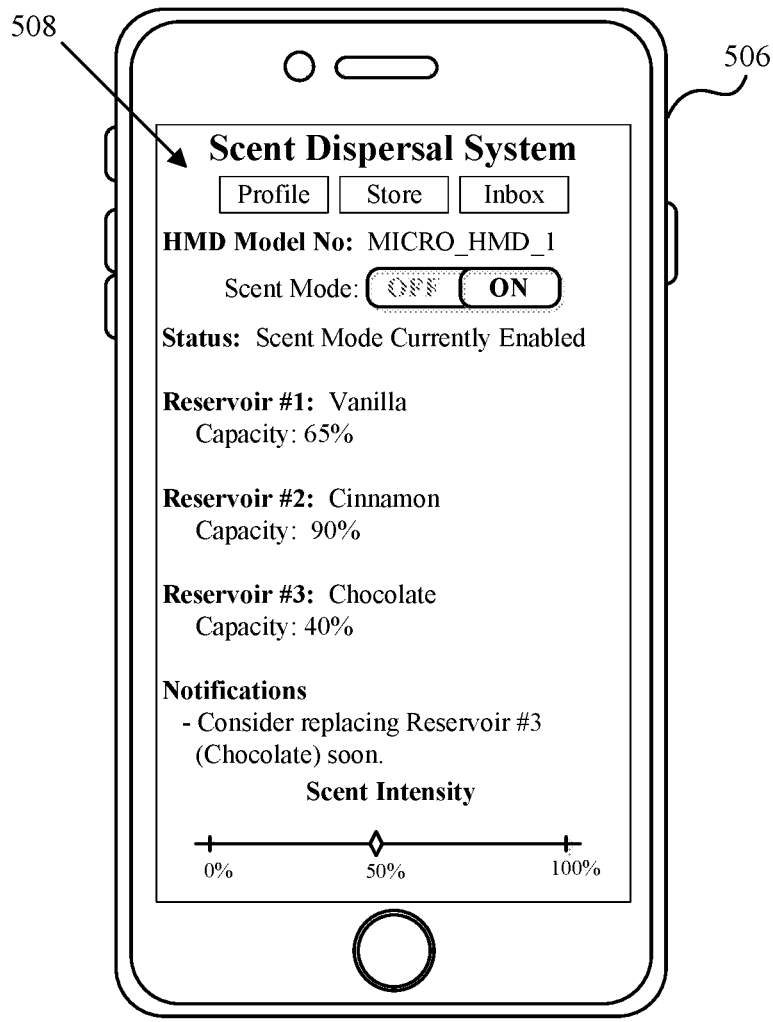
FIG. 5B depicts an interface that is associated with an HMD configured to dispense scent(s).

FIG. 5B depicts a user device 506 that is able to access an interface 508 for interacting with an HMD and/or a scent delivery system. The interface 508 may allow a user to customize an olfactory experience enabled by content that supports scent functionality (e.g., sports-themed video game 504). For example, the user may opt to decrease the intensity of the dispensed scent(s) or disable scent functionality in its entirety. The interface 508 may also allow the user to ensure that the scent delivery system and/or the relevant content are appropriately connected/uploaded to the HMD.

One skilled in the art will recognize that entirely new experiences can also be developed for HMDs that are able to dispense scent(s). For example, a first user could visit a virtual flower shop where the first user is able to select a digital flower that is subsequently delivered to a second user. The digital flower may be associated with a certain scent that is dispensed when the second user receives the digital flower and attempts to smell it. Delivery of the digital flower and/or dispersal of the certain scent could be manually triggered by the first user or automatically triggered by a software program that monitors the second user's reactions to receiving the digital flower. Olfactory experiences like this could be (and often are) paired with visual and audible experiences to increase realism.

In some embodiments, the scent delivery system and/or the HMD is programmable through an interface that is accessible via a web browser, a mobile application, or a desktop software program. For example, if the digital flower is intended to be a gift on the second user's birthday, the first user could set the delivery for a particular day or time.

The same interface (or an entirely different interface) may allow a user to adjust the concentration or amount of scent(s) dispensed by the scent delivery system. For example, the user might elect to decrease the intensity of scent(s) dispensed by the scent delivery system or prevent certain types of scents (e.g., floral scents, salty scents) from being dispensed.

As another example, a user might visit a virtual perfume/cologne shop where the user is able to view and smell different products. The user could purchase a scent as part of a gift (e.g., paired with a cinematic movie or a digital card) so that the scent is experienced by another user. The user may also be able to test the scents of different perfumes/colognes before placing an online order for a physical container of the perfume/cologne. Although the scent of a perfumes or colognes is not likely to be replicated exactly, the scent(s) dispensed by a scent delivery system enable the user to have a better understanding of whether the perfume or cologne is intended to have a sweet, floral, etc., fragrance.

Content (e.g., audiobooks and digital content, such as applications, games, and cinematic videos) can be specially designed for use with an HMD having a scent delivery system. However, in some embodiments, older, non-scented content can also be repurposed for use with HMDs having a scent delivery system. For example, an administrator (e.g., a designer, writer, or individual consumer of content) may be able to tag older, non-scented content to create keyframes that cause the HMD and/or scent-enabling unit to dispense one or more scents. More specifically, the administrator could upload the older, non-scented content to an interface and manually specify which scent(s) should be dispensed, how much of each scent should be dispensed (e.g., faint, medium, or strong aroma), when each scent should be dispensed, etc. A repurposing engine that is responsible for generating the interface may also be configured to automatically recommend these criteria (e.g., scent type, dispersal time, dispersal quantity) after reviewing and analyzing the older content. Thus, older, non-scented content could be manually repurposed into scented content by an administrator and/or automatically repurposed into scented content by a repurposing engine. The older content could be two-dimensional (2D) content or three-dimensional (3D) content.

FIG. 6 depicts a process 600 for attaching a scent delivery system to an HMD. One skilled in the art will recognize, however, that the scent delivery system could also be built into the HMD itself. A scent delivery system is initially provided to a user (e.g., an individual consumer of augmented or virtual reality content) (step 602). The scent delivery system could be designed to be paired with all HMDs or a subset of HMDs (e.g., only Oculus Rift, Microsoft HoloLens, etc.). Oftentimes, the scent delivery system will include one or more fasteners, such as magnets or mechanical clips/tracks, that enable the user to readily secure the scent delivery system to an HMD (step 604).

In some embodiments, the user is able to readily replace one or more capsules housed within the scent delivery system (step 606). For example, the scent delivery system may include a compartment that is easily accessible when the scent delivery system is attached to the HMD. The capsules could also be housed within a separate compartment that is connected to the scent delivery system. For example, a separate compartment that includes multiple capsules could be affixed to the side or back of the HMD.

The scent delivery system and/or the HMD can enable the user to modify whether a scent feature is enabled or disabled (step 608). For example, the scent delivery system could include a mechanical on/off switch or the HMD could display an electronic interface that allows the user to select whether the scent feature is engaged. When the scent feature is enabled, one or more scents can be dispensed by the scent delivery system (step 610). More specifically, the scent(s) can be dispensed at certain points in time, in response to determining a particular type of digital content is being shown, etc.

In some embodiments, scent circuitry (and, more specifically, a content-monitoring module) causes a scent to be automatically dispensed by the scent delivery system in response to determining a particular scene of digital content is being shown by the HMD. For example, an image of a field of flowers could trigger the release of a floral scent, while an ocean view may trigger the release of a salty scent. Additionally or alternatively, the delivery of a scent could be manually triggered by the user (e.g., by pushing a mechanical button on the scent-enabling unit or HMD or by audibly delivering a command). Similarly, the delivery of a scent could be triggered by the scent circuitry based on motion data received from one or more motion sensors (e.g., inertial sensors, accelerometers) coupled to the HMD and/or the scent delivery system. When we want to smell an object in real life, we typically move our heads closer to the object. In some embodiments, the HMD and/or the scent delivery system is able to replicate that experience by dispensing scent(s) in response to determining the user's head has begun moving toward where a digital object is presented. For example, the scent delivery system may dispense a floral scent upon determining that the user's head has moved toward where a digital flower is theoretically positioned, and then stop dispensing the floral scent upon determining the user's head has begun moving away from that position.

In some embodiments, the scent delivery system and/or the HMD facilitate dispersal of the scent(s) after a predetermined time period or in response to an action completed by the user. For example, a fan may be configured to periodically or continuously circulate air around the user's nose. As another example, a fan could begin running or more subtle scent(s) could be dispensed upon determining the user has performed an action with respect to the augmented or virtual reality content being shown by the HMD (e.g., the user moves to a different digital environment).

FIG. 7 depicts a process 700 for dispensing one or more scents by a scent delivery system that is attached to an HMD. Initially, scent circuitry of the scent delivery system receives an indication that a scent feature has been enabled (step 702). As noted above, the scent feature could be enabled using a mechanical switch on the scent delivery system, an electronic interface presented by the HMD, etc. The scent circuitry, meanwhile, can include a power supply, memory, processor(s), and/or communication module(s) that enable the scent delivery system to communicate with the HMD across a wired or wireless communication channel.

The scent delivery system can monitor the content shown or projected by the HMD (step 704). The content could be, for example, visual content (e.g., cinematic videos, applications, or video games) or non-visual content such as audio files. The scent delivery system can then generate an output signal in response to determining a particular keyframe of the content has been reached (step 706). The term "keyframe" refers to an instance within the content (e.g., a visual scene or audio frame) that causes one or more scents to be dispensed. The term can apply regardless of whether the experience is visual or non-visual. For example, both cinematic videos and audiobooks can have keyframe(s) arranged throughout their runtime.

The output signal could also include other metadata about the scent(s) to be dispensed. For example, the output signal could specify which scent(s) should be dispensed and the intensity (i.e., amount) of each scent. The output signal (and any corresponding metadata) can be generated a software module based on various user characteristics, such as age, gender, lifestyle, etc.

Typically, the output signal is transmitted to the scent circuitry of the scent delivery system (step 708). The scent circuitry is able to process the output signal in order to determine which scent(s) are to be dispensed, how much of each scent should be dispensed, etc. The scent circuitry can then cause pump(s) to dispense the scent(s) (step 710). The amount of scent(s) released by the pump(s) may correspond to what content is being shown by the HMD. For example, the amount of scent dispensed by a pump may be reduced if the user is concurrently experiencing visual stimulation (i.e., digital content) that is related to the scent. Said another way, only a small amount of scent may need to be dispensed when the user is also expected to experience significant visual and audible stimulation. For example, only a small amount of lemon scent may be necessary if a bowl of lemons and a pitcher of lemonade are viewable at the same time, while a larger quantity of lemon scent may be needed if the user is walking through a digital citrus grove whose fruit is not easily viewable. Thus, scent circuitry may consider what each of the user's other senses are expected to experience at a given time.

In some embodiments, the scent delivery system and/or the HMD are configured to monitor the user's reaction to the scent (step 712). The HMD and/or the scent delivery system may include sensor(s) that monitor whether the user's temperature has begun to rise or whether the user has begun to sweat (which may indicate overstimulation of the user's senses). Similarly, the HMD and/or the scent delivery system may include motion sensor(s) that monitor whether the user begins to move her head away from where the digital content is theoretically presented or whether the user has begun to shake her head (which may indicate the dispensed scent is too strong and that a fan should begin circulating the air around the user's nose).

Processing System

Figure 8:
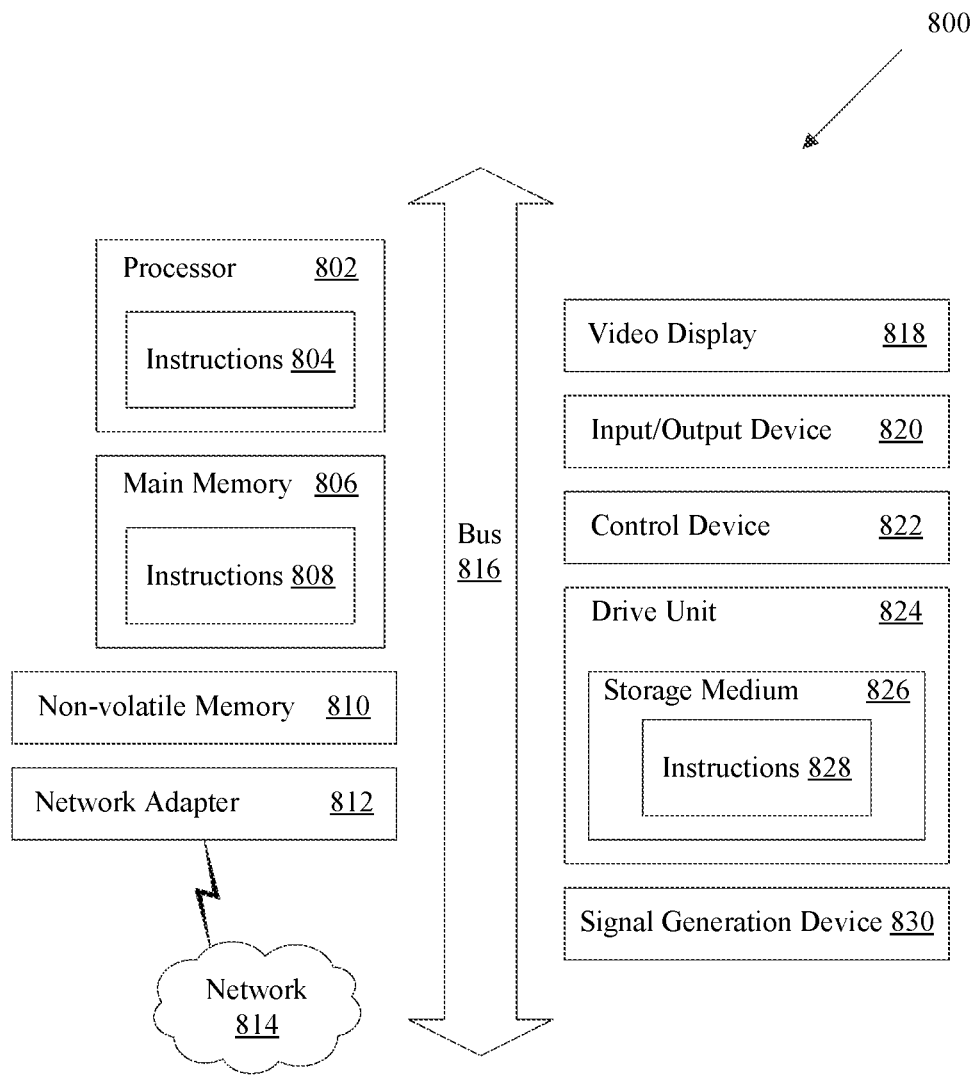
FIG. 8 is a block diagram illustration an example of a processing system in which at least some operations described herein can be implemented, consistent with various embodiments.

FIG. 8 is a block diagram illustrating an example of a processing system 800 in which at least some operations described herein can be implemented. The computing system may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 800 operates as part of an HMD (e.g., HMD 200 of FIG. 2), although the processing system 800 may be connected (e.g., wired or wirelessly) to the HMD. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer (PC), a tablet PC, a laptop computer, a personal digital assistant (PDA), a cellular telephone, an iPhone®, an iPad®, a Blackberry®, a processor, a telephone, a web appliance, a network router, switch or bridge, a console, a hand-held console, a gaming device, a music player, or any portable, device or any machine capable of executing a set of instructions (sequential or otherwise) that specify actions to be taken by the processing system.

While the main memory 806, non-volatile memory 810, and storage medium 826 (also called a "machine-readable" medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A scent delivery system comprising:
   a structural frame that includes
     multiple fasteners for detachably connecting the scent delivery system to a head-mounted display, and
     one or more outlets that allow air to circulate between an internal cavity formed by the structural frame and an external environment,
     wherein a user's nose is located within the internal cavity while using the scent delivery system;
   a plurality of capsules of scented liquid that are removable from the scent delivery system by the user,
     wherein each capsule corresponds to a different video game playable by the user on the head-mounted display;
   a plurality of pumps,
     wherein each pump corresponds to one of the plurality of capsules and is configured to selectively dispense the corresponding scented liquid;
   scent circuitry configured to generate signals that specify how much of each scented liquid should be dispensed by each pump at a given time; and
   a fan configured to guide air from the internal cavity to the external environment through the one or more outlets of the structural frame,
   wherein the plurality of capsules, the plurality of pumps, the scent circuitry, and the fan are disposed within the internal cavity of the structural frame.

2. The scent delivery system of claim 1, wherein the fan continuously or periodically circulates the air within the internal cavity of the structural frame.

3. The scent delivery system of claim 1, further comprising:
one or more sensors that are coupled to the structural frame and are configured to measure motion of the scent delivery system, the user's temperature, ambient humidity, or a combination thereof.

4. A method comprising:
receiving an indication that a scent feature of a scent delivery system has been enabled by a user,
wherein the scent delivery system is detachably connected to a head-mounted device via a quick release mechanism;
monitoring digital content that is presented by the head-mounted display to the user;
generating an output signal in response to determining a keyframe of the digital content has been shown;
transmitting the output signal to scent circuitry of the scent delivery system;
causing a pump of the scent delivery system to dispense a scented liquid from a reservoir that is housed within the scent delivery system;
monitoring the user's reaction to dispensing of the scented liquid by the pump of the scent delivery system using one or more sensors,
wherein the one or more sensors include a temperature sensor configured to detect whether the user's temperature has exceeded a specified threshold, a humidity sensor configured to detect whether the user has begun to sweat, or both;
responsive to a determination that the user's temperature has exceeded the specified threshold or the user has begun to sweat,
activating a fan configured to guide scented air through one or more outlets of the scent delivery system away from the user's nose.

5. The method of claim 4, wherein the head-mounted display is a binocular head-mounted display configured to display virtual reality content.

6. The method of claim 4, wherein the head-mounted display is a monocular head-mounted display configured to display augmented reality content.

7. The method of claim 4, wherein the reservoir is one of multiple reservoirs housed within the scent delivery system, and wherein each of the multiple reservoirs holds a different scented liquid.

8. The method of claim 7, wherein causing the pump to dispense the scented liquid from the reservoir further comprises:
causing multiple pumps to simultaneously dispense different scented liquids responsive to signals provided by the scent circuitry.

9. The method of claim 4, wherein the scent circuitry is communicatively coupled to a computing device across a network.

10. A head-mounted display comprising:
an optical display surface on which a user views digital content;
an image display system configured to project the digital content onto the optical display surface;
a structural frame that forms an internal cavity in which the user's nose is located while using the head-mounted display;
a memory;
a processor communicatively coupled to the image display system and operable to execute instructions stored in the memory;
a plurality of reservoirs that each hold a scented liquid;
a plurality of pumps,
wherein each pump corresponds to one of the plurality of reservoirs and is configured to selectively dispense the corresponding scented liquid; and
a fan configured to guide air from the internal cavity to an external environment through one or more outlets of the structural frame, the one or more outlets allowing air to circulate between the internal cavity and the external environment.

11. The head-mounted display of claim 10, wherein the plurality of reservoirs and the plurality of pumps are embedded within the structural frame and disposed so that the scented liquids are dispensed toward the user's nose.

12. The head-mounted display of claim 10, wherein the plurality of reservoirs are connected to, and supported by, the structural frame.

13. The head-mounted display of claim 10, wherein the fan is embedded within the structural frame.

14. The head-mounted display of claim 10, wherein the memory includes specific instructions for dispensing the scented liquids in the plurality of reservoirs, wherein the specific instructions cause the processor to:
receive an indication that a scent feature of the head-mounted display has been enabled by the user;
continuously monitor digital content presented by the image display system on the optical display surface;
generate an output signal in response to determining a keyframe of the digital content has been shown to the user;
transmit the output signal to scent circuitry responsible for controlling the plurality of pumps;
causing at least one pump to dispense at least some of the scented liquid within the corresponding reservoir; and
monitor the user's reaction to dispensing of the scent.

15. The head-mounted display of claim 14, wherein monitoring the user's reaction to the scent further comprises:
processing data signals generated by one or more sensors coupled to the structural frame of the head-mounted display.

16. The head-mounted display of claim 15, wherein the one or more sensors include humidity sensors, temperature sensors, motion sensors, or a combination thereof.

17. The head-mounted display of claim 10, further comprising:
a communication module that enables the head-mounted display to be communicatively coupled to another computing device.

18. The head-mounted display of claim 17, wherein the other computing device is a mobile phone, a tablet, a wearable electronic device, or a personal computer.

19. A system for repurposing virtual reality content to be compatible with a head-mounted device that is connected to a scent delivery system, the system comprising:
a processor operable to execute instructions stored in a memory; and
the memory, which includes specific instructions for repurposing virtual reality content to be compatible with a head-mounted device that is connected to a scent delivery system, wherein the specific instructions cause the processor to:
enable an administrator to upload a virtual reality content file that does not include any keyframes that would prompt the scent delivery system to dispense a scent;
analyze the virtual reality content file uploaded by the administrator to identify relevant scents;

automatically scan the virtual reality content file to identify one or more instances that represent candidates to become keyframes;

recommend a scent for dispensing by the scent delivery system of the head-mounted device for each of the one or more instances;

enable the administrator to accept or decline each of the recommended scents at each of the one or more instances;

enable the administrator to manually specify a keyframe in the virtual reality content file; and convert the virtual reality content file into a scent-enabled content file by generating a new virtual reality content file that includes those keyframes confirmed by the user and those keyframes manually specified by the user.

20. The system of claim 19, wherein enabling the administrator to manually specify the keyframe in the virtual reality content file further comprises:

allowing the administrator to identify a particular scent that will be dispensed by the scent delivery system upon showing the keyframe;

allowing the administrator to identify how much of the particular scent will be dispensed by the scent delivery system upon showing the keyframe; and allowing the administrator to identify a duration over which the particular scent will be dispensed by the scent delivery system.

21. The system of claim 19, wherein the virtual reality content file includes visual content and audio content.

* * * * *